L. DUCRO.
BALL CASTER.
APPLICATION FILED FEB. 16, 1912. RENEWED JAN. 29, 1914.

1,094,782.

Patented Apr. 28, 1914.

Witnesses:

Inventor
Lewis Ducro
Attorney

UNITED STATES PATENT OFFICE.

LEWIS DUCRO, OF CLEVELAND, OHIO, ASSIGNOR OF ONE-HALF TO EDWARD A. O'NEIL, OF CLEVELAND, OHIO, AND ONE-HALF TO C. W. FISHLEY AND W. J. OCKINGTON.

BALL-CASTER.

1,094,782.

Specification of Letters Patent.  Patented Apr. 28, 1914.

Application filed February 16, 1912, Serial No. 678,062. Renewed January 29, 1914. Serial No. 815,287.

*To all whom it may concern:*

Be it known that I, LEWIS DUCRO, a citizen of the United States, residing at Cleveland, in the county of Cuyahoga and State of Ohio, have invented certain new and useful Improvements in Ball-Casters, of which the following is a specification.

My invention relates to improvements in ball-casters, the primary object of the invention being to provide a generally improved furniture caster of this class of exceedingly simple, cheap, and efficient construction, having its parts so arranged and disposed relative to each other as to reduce friction to a minimum as well as to provide against any liability of disarrangement or breakage of parts.

The invention relates more particularly to an improved anti-friction bearing for the caster-ball in the form of a case hardened steel ring presenting a very limited surface adapted to receive and bear against the surface of the caster-ball so that the latter will turn freely in its movements.

A still further object is to provide an improved caster of this class in which the various parts are so constructed and arranged as to provide for the ready removal and renewal or replacement of the parts in case of great wear or breakage.

With the above mentioned and other ends in view, the invention consists in the novel construction, arrangement, and combination of parts, hereinafter described, illustrated in one of its embodiments in the accompanying drawings, and particularly pointed out in the appended claims.

Figures 1, 2:
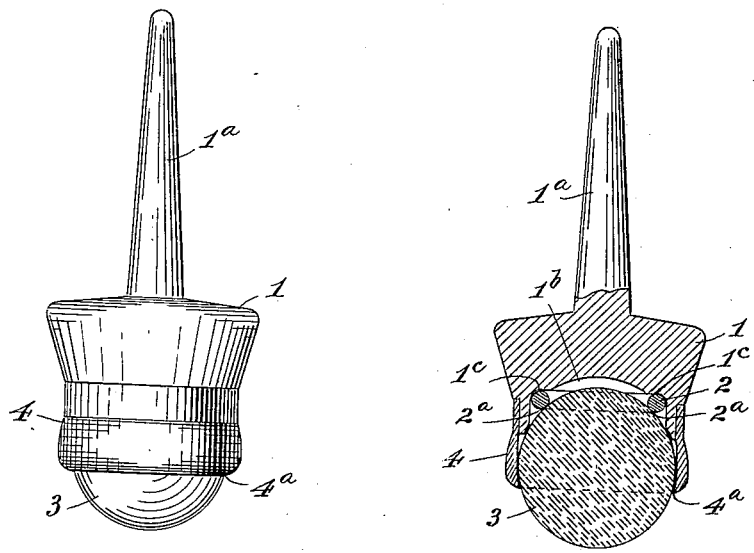
Figure 3:
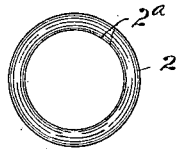
Figure 4:
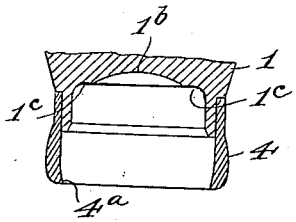

Referring to the drawings, forming a part of this specification, Figure 1, is a side elevation of a caster constructed in accordance with my invention. Fig. 2, a central vertical sectional view of the same. Fig. 3, a plan view of the improved bearing ring, detached. Fig. 4, a sectional view of the socket bearing head, the improved bearing ring and caster-ball being removed.

Similar numerals of reference designate like parts throughout all the figures of the drawings.

The improved caster comprises a supporting base or bearing head 1, which may be of any suitable and convenient construction, and attached to the article to be supported in any suitable and convenient manner, as for example,—by means of a bearing-pin or pintle $1^a$. The base or bearing head 1, is provided with a socket portion $1^b$, and a bearing ring 2, adapted to receive and form the only point of friction contact with the subjacent caster-ball 3, when the latter is supporting the superposed load. The bearing ring 2, is preferably removably mounted in the socket portion $1^b$, and is preferably formed of "hardened" steel, the caster-ball 3, being adapted to move freely within and beneath the bearing ring 2, the latter being rounded in cross section as shown in Fig. 2, so that only a small portion $2^a$, of the ring surface comes into contact with the caster-ball 3. The smooth and comparatively limited surface of the caster-ball 3, coming into contact with the very limited and hardened bearing surface $2^a$, of the hardened steel bearing ring 2, an excellent anti-friction bearing is formed so that the caster-ball 3, will turn freely in and be guided solely by the bearing ring 2, in the movements of the caster. The caster-ball 3, is removably held in the socket portion $1^b$, and in proper relative position with respect to the bearing ring 2, by means of a retaining cap or ring 4, the lower edges $4^a$, of the latter being of slightly less diameter than the greatest diameter of the caster-ball so that when the article to which the caster is attached is lifted, the caster-ball 3, will be retained in the socket and in proper relative position to the bearing ring 2. The lower edges $4^a$, of the retaining ring 4, preferably do not touch the caster-ball 3, when the latter is in its operative position as shown in Fig. 2, so that the only point of contact is between the caster-ball 3, and the anti-friction bearing ring 2, during the movements of the caster in supporting superposed loads. The bearing ring 2, is preferably removably mounted in the socket portion $1^b$, of the supporting base 1, by means of an annular seat or ledge $1^c$, as illustrated most clearly in Figs. 2, and 4 of the drawings. By this arrangement the parts may be readily assembled or removed for inspection or removal.

From the foregoing description, taken in connection with the accompanying drawings, the operation and advantages of my invention will be readily understood.

Having thus described one of the embodi- ments of my invention, what I claim and desire to secure by Letters Patent is,—

1. In a ball caster, a relatively hard non-rotatably mounted steel bearing ring, and a caster ball mounted beneath and adapted to revolve within said bearing ring.

2. In a ball caster, a non-rotatable removably mounted bearing ring, a caster ball mounted beneath and revoluble within said ring, and means for retaining said caster ball in proper relative position when the latter is moved out of frictional contact with said bearing ring.

In testimony whereof I have affixed my signature in presence of two witnesses.

LEWIS DUCRO.

Witnesses:
O. C. BELLMAN,
E. J. THOBABEN.

Copies of this patent may be obtained for five cents each, by addressing the "Commissioner of Patents, Washington, D. C."